United States Patent
Hasti et al.

(10) Patent No.: US 8,589,605 B2
(45) Date of Patent: Nov. 19, 2013

(54) INBOUND MESSAGE RATE LIMIT BASED ON MAXIMUM QUEUE TIMES

(75) Inventors: Srinivas Hasti, Stamford, CT (US); Michael J. Spreitzer, Croton-on-Hudson, NY (US); Graham D. Wallis, West Wellow (GB); David Ware, Willows (GB); Neil G. S. Young, Highfield (GB)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/134,366

(22) Filed: Jun. 6, 2008

(65) Prior Publication Data

US 2009/0307393 A1  Dec. 10, 2009

(51) Int. Cl.
*G06F 5/14* (2006.01)

(52) U.S. Cl.
USPC .......................................... 710/54; 709/206

(58) Field of Classification Search
None
See application file for complete search history.

(56) References Cited

U.S. PATENT DOCUMENTS

| | | | |
|---|---|---|---|
| 5,901,334 A | 5/1999 | Banks et al. | |
| 6,463,291 B1* | 10/2002 | Lahtinen | 455/466 |
| 6,501,733 B1* | 12/2002 | Falco et al. | 370/235 |
| 7,177,274 B2 | 2/2007 | Van Der Zee et al. | |
| 7,257,216 B2* | 8/2007 | Schantz | 379/229 |
| 7,647,383 B1* | 1/2010 | Boswell et al. | 709/207 |
| 2005/0144246 A1* | 6/2005 | Malik | 709/206 |
| 2006/0109857 A1* | 5/2006 | Herrmann | 370/412 |
| 2007/0008986 A1 | 1/2007 | Xie et al. | |

\* cited by examiner

*Primary Examiner* — Idriss N Alrobaye
*Assistant Examiner* — Dayton Lewis-Taylor
(74) *Attorney, Agent, or Firm* — Cantor Colburn LLP; Yuanmin Cai

(57) ABSTRACT

A system for managing inbound messages in a server complex including one or more message consumers. The system includes a server configured to receive the inbound messages from a first peripheral device and to transmit messages to one or more of the plurality of message consumers. The system also includes an inbound message queue coupled to the server, the inbound message queue configured to store inbound message until an age of any message stored on the inbound message queue exceeds a predetermined threshold.

15 Claims, 2 Drawing Sheets

INBOUND MESSAGE RATE LIMIT BASED ON MAXIMUM QUEUE TIMES

BACKGROUND OF THE INVENTION

The present disclosure relates generally to computing devices, and, in particular, to managing an inbound message queue in a computing device.

An asynchronous messaging system handles request messages that represent inbound work (requests) for a server complex that includes message consumers. Request messages are received onto queues and then dispatched to the message consumers. The request messages may require a response or may represent one-way notifications that do not require a response. Examples of one-way notifications may include, for example, a submission of data from a remote sensor that is to be checked/recorded.

Response time refers to the time taken to process the request message—i.e. how long has the request message had to wait on the request queue (and associated transmission queues in the messaging system) before it is delivered to the message consumer. The response time does not relate to the (optional) generation or receipt of a response message. The overall rate at which work is accepted into the server complex has to be managed, otherwise long response times may occur.

It is well known that the amount of work can be limited by limiting the length of the request queue. In operation, limiting the length of the request queue includes accepting and queuing messages until the queue reaches its length limit. After the limit has been reached, newer messages are rejected. Operating in this manner has the effect of honoring older messages, and synchronously rejecting newer ones, and thereby making accepted messages sacred. This avoids the possibility of accepted messages being preempted by newer messages. One of the characteristics of this model is that in order to be able to handle bursty traffic the queue needs a relatively long maximum length; the disadvantage of this is that a full queue (one that has reached its limit) consumes a significant amount of resources. For example, each message may occupy hundreds of MB of storage and there may be hundreds or even thousands on the queue. This is undesirable because it loads the messaging system, affecting its ability to browse (locate messages) and the time it will take to recover from a failure. It also means that there is a large backlog of messages that need to be processed before the system becomes responsive.

Of course, many other solutions exist in the art but each of them may have their own shortcomings.

BRIEF SUMMARY OF THE INVENTION

Embodiments of the invention include a system for managing inbound messages in a server complex including a plurality of message consumers. The system includes a server configured to receive the inbound messages from a first peripheral device and to transmit messages to one or more of the plurality of message consumers. The system also includes an inbound message queue coupled to the server, the inbound message queue configured to accept the inbound messages until an age of any message stored on the inbound message queue exceeds a predetermined threshold.

Further embodiments include a method of managing inbound messages at a server. The method of this embodiment includes determining an age of an oldest message on an inbound message queue coupled to the server; and rejecting an inbound message in the event that the age of the oldest message exceeds a predetermined threshold.

Another embodiment of the present invention is directed to a system for managing inbound messages in a server complex including one or more message consumers. The system of this embodiment includes a server configured to receive the inbound messages from a first peripheral device and to transmit messages to the one or more message consumers. The system of this embodiment also includes an inbound message queue coupled to the server that includes a configurable threshold value and is configured to accept the inbound messages until the threshold value is exceeded. The threshold value is independent of a size of the inbound message queue.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Embodiments of the present invention may overcome some or all of the problems associated with the prior art by keeping track of the "age" of the oldest message on the queue, and refusing to accept further messages onto a queue when the age of the oldest message exceeds a configured/variable maximum limit. The "age" of a message on the queue is defined as the amount of time that the message has spent waiting on that queue, and optionally any transmission queues on its route to the queue.

Figure 1:
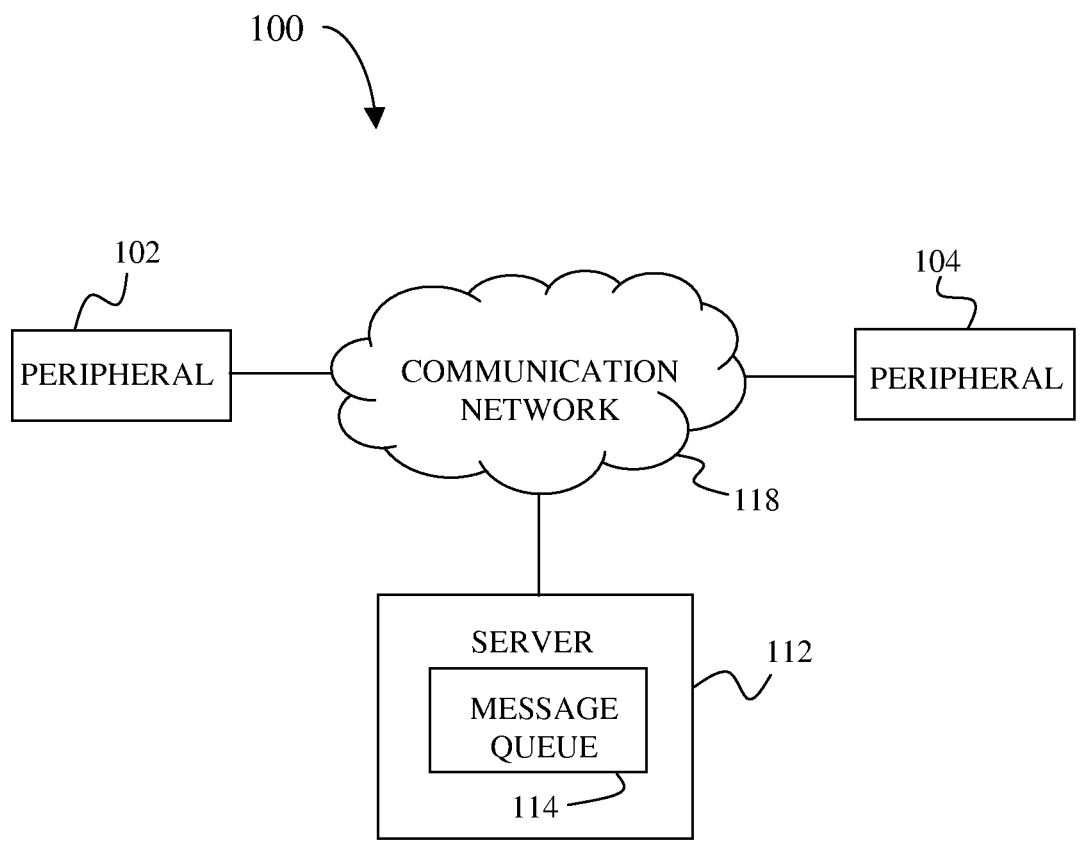
FIG. 1 depicts a system according to one embodiment of the present invention.

FIG. 1 shows an example of a system 100 according to an embodiment of the present invention. The system includes first and second peripheral devices 102 and 104, respectively. Each peripheral device 102 and 104 may be implemented using a general-purpose computer executing a computer program for carrying out the processes described herein. The peripheral devices 102 and 104 may be a personal computer (e.g., a lap top, a personal digital assistant) or a host attached terminal. Of course, the system 100 could include many more peripheral devices and is not limited to peripheral devices. Of course, the peripheral devices are not limited to being personal computers and may be any device capable of creating a message to be transferred to another device. Further examples of such devices include sensors that report data.

The first and second peripheral devices 102 and 104, respectively, are coupled to each other and a server 112 via a communications network 118. The communications network 118 may be any type of known network including, but not limited to, a wide area network (WAN), a public switched telephone network (PSTN) a local area network (LAN), a global network (e.g. Internet), a virtual private network (VPN), and an intranet. The communications network 118 may be implemented using a wireless network or any kind of physical network implementation known in the art. Peripheral devices 102 and 104 may be coupled to the server 112 through multiple networks (e.g., intranet and Internet) so that not all user systems are coupled to the host systems 104 through the same network. One or more user systems and the server 112 may be connected to the network 118 in a wireless fashion.

The server 112 depicted in FIG. 1 may be implemented using one or more servers operating in response to a computer program stored in a storage medium accessible by the server 112. The server 112 may operate as a network server (e.g., a web server) to communicate with the user systems 102 and 104. The server 112 handles sending and receiving information to and from the peripheral devices 102 and 104 and can perform associated tasks. The server 112 may also include firewalls to prevent unauthorized access and enforce any limitations on authorized access. For instance, an administrator may have access to the entire system and have authority to modify portions of the system. A firewall may be implemented using conventional hardware and/or software as is known in the art.

The server 112 may also include a message queue 114. The message queue 114 may be part of the server 112 as shown or may be a standalone unit. The message queue 114 may, in some embodiments, be an inbound message queue that stores inbound messages until they are delivered to a message consumer. For example, the first peripheral device 102 may generate a message for delivery to the second peripheral device 104. The message may be received, via the communications network 118, by the server 112 and stored in the message queue 114 until it may delivered to the second peripheral device 104.

FIG. 1 shows only two peripheral devices 102 and 104. Of course, according to embodiments of the present invention, the number of peripheral devices is not limited to two and the system 100 may include any number of peripheral. As such, the message queue 114 may store messages from any number of peripheral for delivery to any number of message consumers.

The message queue 114 may be of predetermined length. That is, the message queue may be able store messages until the length is met. After this point, new messages are rejected. As discussed above, to be able to handle burst traffic, the length of the message queue must be relatively long and when the queue is full a significant amount of memory may be consumed by the messages. This may lead to the attendant problems described above.

According to one embodiment of the present invention, the message queue 114 may be configured to accept messages until the "age" of the oldest message on the queue exceeds a configured/variable maximum limit, and to reject further messages. Of course, the message queue 114 may again accept messages when the age of the oldest message falls below the maximum limit.

It should be understood that the system 100 may also include multiple message queues. In some embodiments, the amount of time a particular message has spent on any message queue is summed to determine the age of a message.

In more detail, systems according to the present invention may reject new messages without waiting till the queue has filled up, avoiding the multiple problems of excessive resource utilization, poor queue efficiency and long restart recovery time. The system retains its agility without discarding any previously accepted messages, by providing synchronous pushback of new messages. Operating in this manner may be useful for handling message traffic in which any accepted message must be honored. An example of this is messages that convey essential (e.g., auditable) event reports, stock queries or orders.

Figure 2:
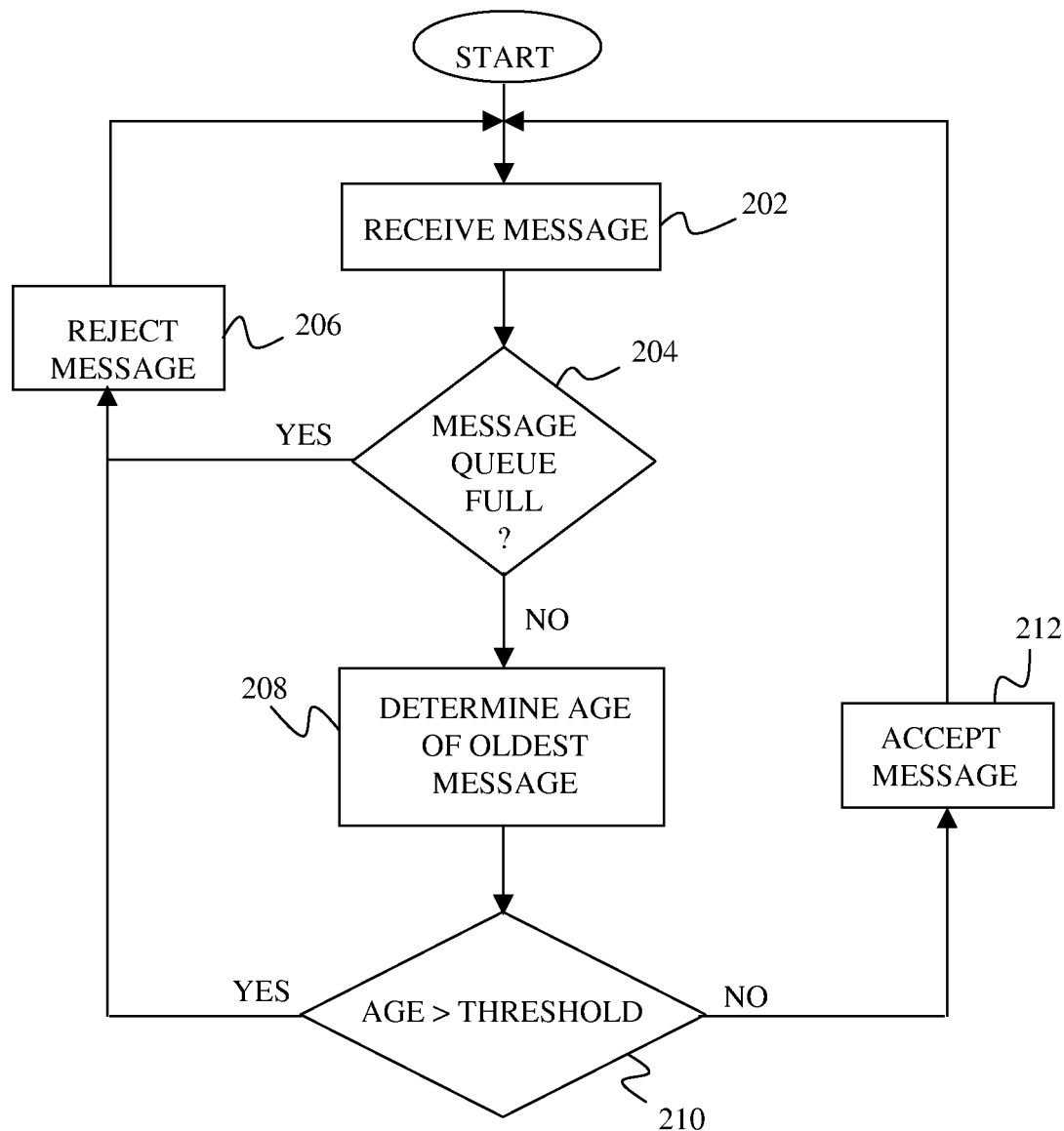
FIG. 2 is flow chart depicting a method according to one embodiment of the present invention.

FIG. 2 depicts a flow diagram of a method according to an embodiment of the present invention. At a block 202 a message is received. The message may be received, for example, at a server (or server complex) coupled to a one or more message consumers. The message may be received from any source. In some embodiments, the message may require a response, in others, it may not. At a block 204 it is determined if the inbound message queue is full. The inbound message queue may be determined to be full if the number or size of messages currently thereon exceeds a predetermined threshold or if accepting the new message would put the queue over the threshold.

If the inbound message queue is full, at a block 206 the message is rejected. If the inbound message is not full, the age of the oldest message in the input message queue is determined at a block 208. The age of a message is the time that a particular message has spent waiting on the inbound message queue. In some embodiments, if multiple inbound message queues are present, the age of the message may be the sum of the times the message has spent on any inbound message queue.

At a block 210 it is determined if the age of the oldest message is greater than a predetermined threshold. If it is, the message is rejected at a block 206. If it is not, the message is accepted at a block 212. Regardless, the whenever a message a accepted or rejected, the method returns to block 202.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for managing incoming messages in a server complex including one or more message consumers, the system comprising:
   a server configured to receive the incoming messages from a first peripheral device and to transmit messages to the one or more message consumers; and
   an inbound message queue coupled to the server, the inbound message queue configured to reject the incoming messages when an age of an oldest message previously stored on the inbound message queue exceeds a predetermined threshold;
   wherein the server is configured to determine the age of the oldest message stored on the inbound message queue and wherein the age of the oldest message includes a sum of times the oldest message remained on the inbound message queue and another message queue.

2. The system of claim 1, wherein the server is configured to reject a message if the age of the oldest message is greater than the predetermined threshold.

3. The system of claim 1, wherein the server is connected to the first peripheral device by a communications network.

4. The system of claim 3, wherein the communications network is an Internet.

5. The system of claim 1, further comprising:
   the first peripheral device; and
   a second peripheral device.

6. A method of managing inbound messages at a server, the method comprising:
   determining an age of an oldest message previously stored on an inbound message queue coupled to the server, wherein the age of the oldest message is equal to a sum of an amount of time the oldest message has spent on the inbound message queue and an amount of time the oldest message has spent another message queue; and
   disallowing an inbound message not stored on the inbound message queue from being stored in the inbound message queue when the age of the oldest message exceeds a predetermined threshold.

7. The method of claim 6, further comprising:
   receiving an inbound message.

8. The method of claim 6, further comprising:
   setting the predetermined threshold.

9. The method of claim 6, further comprising:
   determining whether the inbound message queue has exceeded a size limit; and
   rejecting an inbound message in the event that the message queue has exceeded the size limit.

10. The method of claim 9, further comprising:
    setting the size limit.

11. A computer program product for managing inbound messages at a server, the computer program product comprising:
    a non-transitory storage medium for storing instructions for executing the management of inbound messages at a server, the management of inbound messages at a server comprising a method of:
    determining an age of an oldest message previously stored on an inbound message queue coupled to the server, wherein the age of the oldest message is equal to a sum of an amount of time the oldest message has spent on the inbound message queue and an amount of time the oldest message has spent another message queue; and
    disallowing an inbound message not stored on the inbound message queue from being stored in the inbound message queue when the age of the oldest message exceeds a predetermined threshold.

12. The computer program product of claim 11, wherein the method further comprises:
    receiving an inbound message.

13. The computer program product of claim 11, wherein the method further comprises:
    setting the predetermined threshold.

14. The computer program product of claim 11, wherein the method further comprises:
    determining whether the inbound message queue has exceeded a size limit; and
    rejecting an inbound message in the event that the message queue has exceeded the size limit.

15. The computer program product of claim 14, further comprising:
    setting the size limit.

* * * * *